United States Patent [19]

Myer

[11] Patent Number: 5,430,893

[45] Date of Patent: Jul. 4, 1995

[54] RADIO RECEIVER WITH INCREASED DYNAMIC RANGE

[75] Inventor: Robert E. Myer, Denville, N.J.

[73] Assignee: AT&T Corp., Murray Hill, N.J.

[21] Appl. No.: 105,082

[22] Filed: Aug. 11, 1993

[51] Int. Cl.⁶ .............................................. H04B 1/10
[52] U.S. Cl. .................................. 455/209; 455/295; 455/303; 455/306; 455/314
[58] Field of Search ................ 455/295, 296, 302–306, 455/207, 209, 234.1, 314, 317; 307/529; 327/355

[56] References Cited

U.S. PATENT DOCUMENTS

| | | | |
|---|---|---|---|
| 3,611,169 | 10/1971 | Hess et al. | 455/305 |
| 4,166,251 | 8/1979 | Ishigaki et al. | 455/303 |
| 4,246,541 | 1/1981 | Ishigaki | 455/305 |
| 5,222,106 | 6/1993 | Satoh et al. | 455/209 |

Primary Examiner—Edward F. Urban
Attorney, Agent, or Firm—Jason P. DeMont

[57] ABSTRACT

A radio receiver front end having both feedforward and feedback mechanisms to suppress the amplitude of spurious signals so as to prevent those signals from flooding the dynamic range of the mixer of the front end. An illustrative embodiment of the present invention comprises splitting the input signal into a first signal and a second signal, creating a third signal based on the difference of the first signal and a difference signal, mixing down the third signal with a first oscillatory signal, isolating a feedback signal from the mixed down signal, mixing up the feedback signal with a second oscillatory signal and creating the difference signal based on the difference of the second signal and the mixed up signal.

10 Claims, 2 Drawing Sheets

RADIO RECEIVER WITH INCREASED DYNAMIC RANGE

FIELD OF THE INVENTION

The present invention relates to electric circuit design in general, and more particularly, to an improved radio front end.

BACKGROUND OF THE INVENTION

FIG. 1 depicts a schematic diagram of a typical radio front end in the prior art. Signals are received at antenna 101 and are filtered to a desired range of frequencies by bandpass filter 105. Low noise amplifier 107 amplifies the filtered signals to fully exploit the dynamic range of mixer 117. Local oscillator 125 creates a periodic signal which mixer 117 uses to mix-down the signals to a frequency range such that bandpass filter 119 can isolate the desired signal. This technique is advantageous in that it permits the radio to be tuned by adjusting the frequency of local oscillator 125.

SUMMARY OF THE INVENTION

In the prior art mixer 117 must mix-down the desired signal in addition to any undesired signals which fortuitously are also in the frequency band passed by filter 105. This can be disadvantageous if the amplitude of the undesired signals is greater than the amplitude of the desired signal because the undesired signals fill the dynamic range of mixer 117 so as to inhibit the full exploitation of the dynamic range for the benefit of the desired signal.

Embodiments of the present invention are capable of isolating the desired frequencies while avoiding many of the costs and restrictions associated with prior techniques. In particular, embodiments of the present invention can suppress the amplitude of the undesired frequencies such that the dynamic range of the mixer is effectively increased. These results are obtained in an illustrative embodiment of the present invention in which a feedback signal is employed, along with a feedforward signal, to suppress the amplitude of the undesired frequencies.

DETAILED DESCRIPTION

Figure 1:
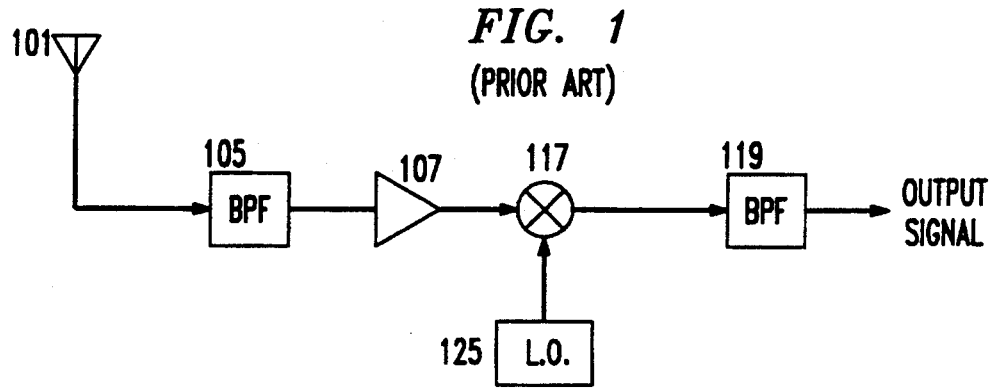
FIG. 1 depicts a schematic diagram of atypical radio front end in the prior art.
Figure 2:
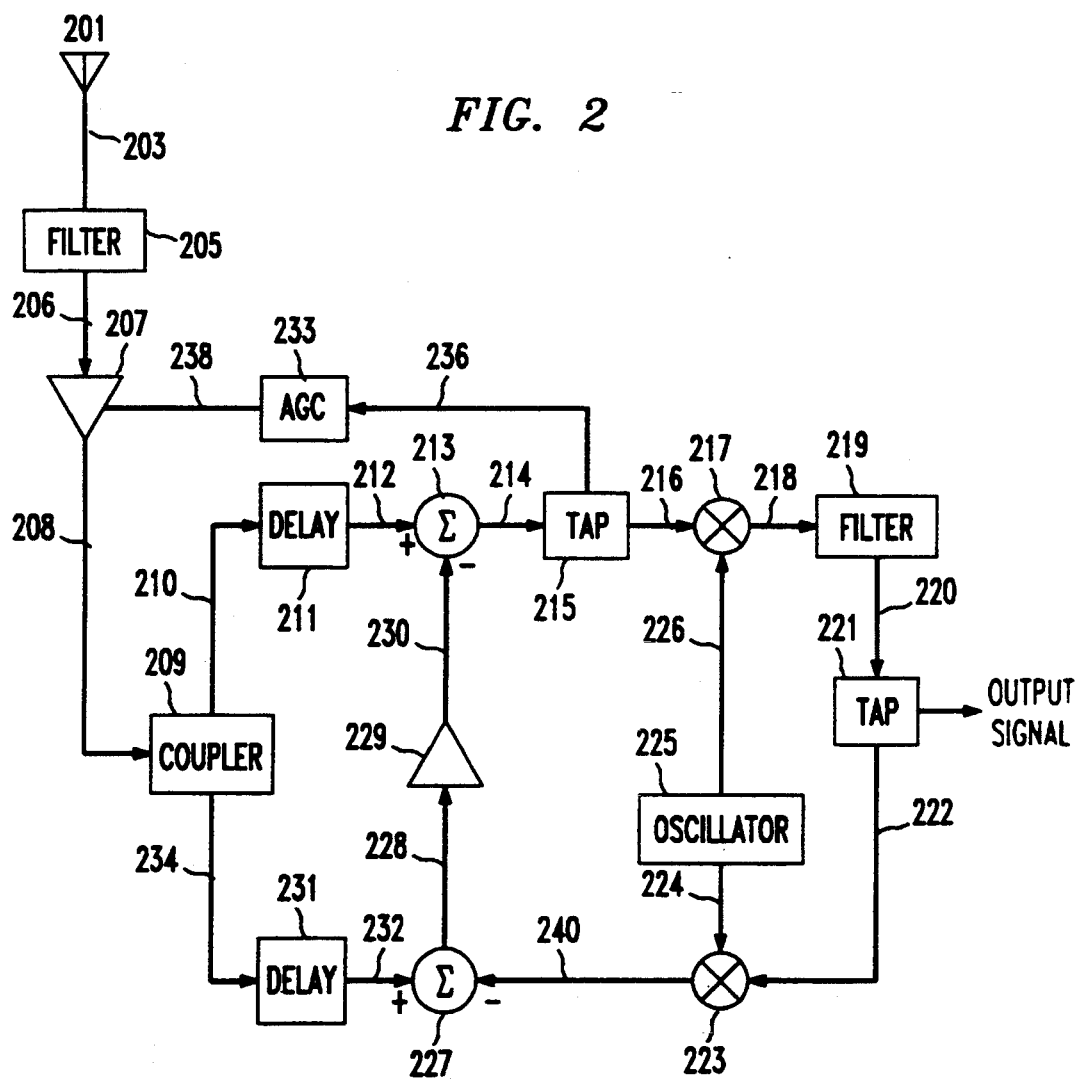
FIG. 2 depicts a schematic diagram of a illustrative embodiment of the present invention.

FIG. 2 depicts a schematic diagram of an illustrative embodiment of the present invention. Radio signals are preferably received by antenna 201 and passed through filter 205, which advantageously passes only some desired band of frequencies. It will be clear to those skilled in the art how to make and use antenna 201 and filter 205. From filter 205, the signal passes to amplifier 207, which preferably amplifies the signal to take full advantage of the dynamic range available provided by mixer 217. Amplifier 207 is preferably a low noise amplifier, the gain of which may advantageously be controlled by automatic gain control circuitry 233.

From amplifier 207, the signal is passed to coupler 209, which advantageously splits the incoming signal into two signals, on lead 210 and lead 234, respectively, such that each signal is substantially an analog representation of the incoming signal. It will be clear to those skilled in the art that coupler 209 can be implemented using a Wilkinson coupler, a 3 dB Hybrid coupler, or any of one of many other devices.

The signal on lead 210 passes through delay 211 and to summer 213, which subtracts the signal on lead 230 from the signal on lead 212 and outputs the difference on lead 214. The length of delay 211 is preferably set so that the delay from coupler 209 to summer 213 via delay 211 is equal to the delay 231, summer 227 and amplifier 229, thus causing the signal on lead 230 to cancel a broadband set of frequency components in the signal on lead 212. It will be clear to those skilled in the art that summer 213 can be implemented using a Wilkinson coupler, a 3 dB Hybrid coupler, a differential amplifier, or any one of many other devices.

Tap 215 advantageously samples the signal emanating from summer 213 and feeds the sample to automatic gain control 233. It will be clear to those skilled in the art that tap 215 can be implemented using a Wilkinson coupler, a 3 dB coupler, or any one of many other devices.

Mixer 217 takes the signal from summer 213, and with the first oscillatory signal on lead 226, mixes down the signal for input to filter 219. The first oscillatory signal is created by oscillator 225. Filter 219 is preferably a narrow bandpass filter which can isolate the desired signal from the range of frequencies output from mixer 217. It will be clear to those skilled in the art how to make and use mixer 217, oscillator 225, and filter 219.

The output of filter 219 represents the output signal of the embodiment and can be sampled by tap 221, for use by the remainder of the radio receiver. It will be clear to those skilled in the art that tap 221 can be implemented using a Wilkinson coupler, a 3 dB coupler, or any one of many other devices.

The output of filter 219 is preferably fed back into a second mixer, mixer 223, which, with a second oscillator signal on lead 225, preferably mixes-up the output signal to the frequency range it was at before it was mixed-down by mixer 217. It is preferred, although not necessary, that the first oscillatory signal on lead 226 and the second oscillatory signal on lead 224 have the same frequency. It will be clear to those skilled in the art how to make mixer 223.

The signal on lead 234 is passed through delay 231 and to lead 232. The length of delay 231 is equal to the delay from summer 213 through mixer 217, filter 219, tap 221, and mixer 223. It will be clear to those skilled in the art how to make and use delay 231.

Summer 227 takes the signal on lead 232 and subtracts from it the signal on lead 240 to produce a signal representing the difference on lead 228. The signal on lead 228 thus resembles the signal on lead 212 except that the frequency components representing the output signal are suppressed. It will be clear to those skilled in the art that summer 227 can be fabricated from a directional coupler, a differential amplifier or any one of many other devices.

The output of summer 227 can be amplified, if necessary, by amplifier 229; it is preferred that the amplitude of the signal on lead 230 be equal to the amplitude of the signal on lead 212.

Figure 3:
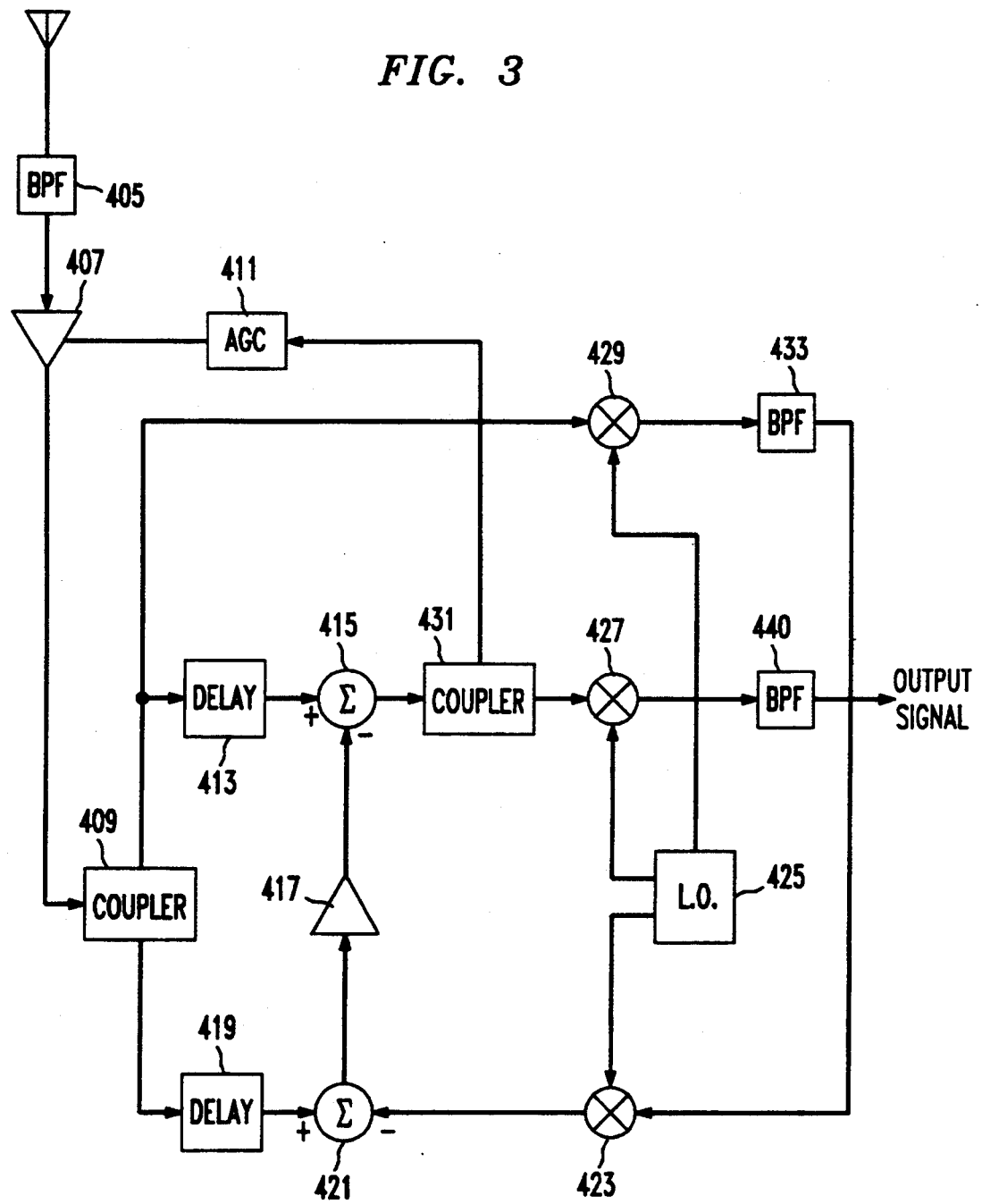
FIG. 3 depicts a schematic diagram of a second illustrative embodiment of the present invention.

FIG. 3 depicts a schematic diagram of an illustrative embodiment of the present invention which provides absolute stability and less loss because of separate loops.

It will be clear to those skilled in the art how to make and use embodiments of the present invention in accordance with FIG. 3.

I claim:

1. An apparatus for processing an input signal, said apparatus comprising:
   means for creating a first signal and a second signal, based on said input signal;
   a first summer for creating a third signal based on the difference of said first signal and a difference signal;
   a first mixer for creating a feedback signal by mixing said third signal with a first oscillatory signal;
   a second mixer for creating a mixed feedback signal by mixing said feedback signal with a second oscillatory signal; and
   a second summer for creating said difference signal based on the difference of said second signal and said mixed feedback signal.

2. The apparatus of claim 1 further comprising a first filter for filtering said feedback signal.

3. The apparatus of claim 1 wherein said means for creating a first signal and a second signal comprises a hybrid coupler.

4. The apparatus of claim 3 wherein said means for creating a third signal comprises hybrid coupler.

5. The apparatus of claim 1 wherein said means for creating said difference signal comprises a directional coupler.

6. The apparatus of claim 1 further comprising:
   an amplifier for amplifying said input signal; and
   automatic gain control means for controlling the gain of said amplifier based on said third signal.

7. The apparatus of claim 1 further comprising:
   an electro-magnetic antenna for creating a radio signal; and
   a second filter for creating said input signal by filtering said radio signal.

8. The apparatus of claim 1 wherein said first oscillatory signal and said second oscillatory signal are identical.

9. A method of processing an input signal comprising:
   splitting said input signal into a first signal and a second signal, wherein said first signal and said second signal are each substantial analog representations of said input signal;
   creating a third signal based on the difference of said first signal minus a difference signal;
   creating a mixed-down signal by mixing down said third signal with a first oscillatory signal;
   isolating a feedback signal from said mixed-down signal;
   creating a mixed-up signal by mixing up said feedback signal with a second oscillatory signal; and
   creating said difference signal based on the difference of said second signal minus said mixed-up signal.

10. The method of claim 9 wherein said first oscillatory signal and said second oscillatory signal have the same frequency.

* * * * *